United States Patent [19]

Loeb et al.

[11] 4,244,351
[45] Jan. 13, 1981

[54] SOLAR COLLECTION SYSTEM
[75] Inventors: Sidney Loeb, Omer, Israel; Gurmukh D. Mehta, Warrenton, Va.
[73] Assignee: InterTechnology/Solar Corporation, Warrenton, Va.
[21] Appl. No.: 958,037
[22] Filed: Nov. 6, 1978
[51] Int. Cl.$^3$ .......................... F24J 3/02; C22B 26/10
[52] U.S. Cl. ..................................... 126/415; 126/400; 126/900; 252/73; 423/206 T
[58] Field of Search ............... 126/436, 437, 415, 430, 126/900, 416; 165/DIG. 4; 252/73; 423/206 T

[56] References Cited

U.S. PATENT DOCUMENTS

| | | | |
|---|---|---|---|
| 2,388,009 | 10/1945 | Pike | 423/206 T |
| 3,314,415 | 4/1967 | Rowekamp | 126/450 |
| 3,372,691 | 3/1968 | Shachar | 126/452 |

Primary Examiner—James C. Yeung
Assistant Examiner—Daniel O'Connor
Attorney, Agent, or Firm—John T. Roberts

[57] ABSTRACT

The concentration of the solute in solution in a saturated non-convecting solar pond is greatest at a lower hotter level decreases continuously toward a higher cooler level and is saturated at all levels, thus preventing solute diffusion. In the customary operation of such saturated non-convecting solar ponds, the heat generated by incident radiation is absorbed in a bottom or lower layer. Because of the continuously decreasing density of solute which is near saturation from the lower to the upper layers, there is little salt convection and the pool tends to be further stabilized. Further, by heating due to absorption of the radiation largely at the lower level, a temperature gradient is maintained in which the upper layers remain cool, evaporation and consequent loss of heat is inhibited and the efficiency of the solar pond is improved. It has been discovered that a brine consisting essentially of an appropriate mixture of sodium carbonate ($Na_2CO_3$) and sodium bicarbonate ($NaHCO_3$) as a solute in water is an especially desirable solution for use in a saturated non-convecting solar pond. A cover material may be used as a barrier material over the solution to impede carbon dioxide transfer across the solution surface.

6 Claims, 4 Drawing Figures

SOLAR COLLECTION SYSTEM

BACKGROUND OF THE INVENTION

One means for collecting solar energy is a solar pond. A solar pond may be defined as "a shallow artificial black bottom pond or lake in which the incident solar insolation is converted into a local temperature rise in the water near the bottom." (Mehta, G. D., "Non-Convecting Solar Ponds", Technical Report ETG-4, Hydronautics, Inc., Oct., 1975). A successful solar pond should develop simultaneously a high temperature at the bottom of the pond as a result of the radiation and a low temperature at the top. The low temperature is desirable to minimize excessive energy losses through evaporation, conduction and radiation.

The objective of high temperature at the bottom and low temperature at the top cannot be readily achieved, if at all, by using a pond containing water alone. With water alone, the higher temperature at the bottom of the pond decreases the density of the liquid relative to that at the surface, thus causing convection currents which quickly equalize the water temperatures. These density convection currents can be eliminated by introducing a density gradient maintained by a suitable salt concentration gradient. Such ponds are referred to as non-convecting solar ponds. They have been tested and studied rather extensively.

One of the advantages of the non-convecting solar pond is that it has a substantial storage capacity. It has been estimated that the solar pond could have a storage capacity of as much as 31 days, i.e. deliver substantial thermal energy for this period without incident sunlight.

The advantage of the storage capacity plus other advantages, such as low cost, make the non-convecting solar pond a promising candidate for the collection of unfocussed solar energy. On the other hand, there are certain disadvantages at present, the major one of which is maintaining the salt concentration gradient necessary for pond stability. The very existence of a salt concentration gradient causes salt diffusion which tends to destroy the gradient. The salt diffusion occurs because the brine is unsaturated at all levels with the salts usually used, such as NaCl or $MgCl_2$, for which solubility is relatively insensitive to temperature. With such salts the saturation concentration is relatively constant over the substantial temperature range which usually prevails from the top to the bottom of the pond. Therefore, the brine is at a lower concentration relative to saturation at the upper, cooler level than at the lower, warmer levels, and diffusion of salt can proceed unimpeded. It has been suggested (Styris, D. L., et al, "The Non-Convecting Solar Pond—an Overview of Technological Status and Possible Applications", Battelle Pacific Northwest Laboratories, Report BNWL-1891-UC-13, Jan., 1975), that the problem of diffusion could be largely solved if the pond were substantially saturated with a salt having a solubility which is a direct function of temperature. In such a saturated non-convecting solar pond (saturated pond for short), one way of viewing the resultant action is that the salt could no longer diffuse successfully to a less concentrated (cooler) region because it would move to an already-saturated region, causing it to precipitate and sink to the hotter, now unsaturated region where it would redissolve. The saturated pond should be self-generating (assuming some temperature gradient always exists from the extra solar radiation absorbed near the bottom), self-maintaining, and self-repairing, all qualities which unsaturated ponds do not possess. Thus the saturated pond should be simpler in construction and operation than the unsaturated pond. Unfortunately, no saturated solar pond has been built because of the apparent lack of a temperature-sensitive solute that is cheap, stable, nontoxic, transparent, available in large quantities and the average solubility of which, over the pond temperature range of 20° to 100° C. is not too high. For example, ammonium nitrate ($NH_4NO_3$) and potassium nitrate ($KNO_3$), have been considered for a saturated solar pond. The curves of FIG. 1 for these compounds are derived from data from Perry Chemical Engineer's Handbook, 4th Edition. With $KNO_3$, for example, the high cost and high average solubility over the desired temperature range are such that the $KNO_3$ for a saturated solar pond would cost in the order of 100 dollars per square meter of pond surface for a typical pond depth of one meter. Such a cost is prohibitively expensive, when it is realized that capital cost in one of the chief contributions to the cost of operating a solar pond. In comparison, with an unsaturated solar pond using $MgCl_2$ or NaCl, the salt would cost in the order of 10 dollars per square meter of pond surface.

PRIOR ART

Other prior publications besides the Styris, et al paper noted above, relating to solar ponds which may have a bearing on the present invention are: Mehta, G. D., "Non-Convecting Solar Ponds", Technical Report ETG-4; "Hydronautics, Inc.", Oct., 1975; Tabor, H., "Large Area Solar Collectors for Power Production", Solar Energy, 7, p. 189, 1963; Jain, G. C., "Heating of Solar Pond", "The Paris Congress on Solar Energy", July, 1973; Saulnier, B., et al, "Field Testing of a Solar Pond", presented at the International Solar Energy Meeting at UCLA, July 28–Aug. 1, 1975; Rabl, A., et al, "Solar Ponds for Space Heating", Solar Energy, Vol. 17, pp. 1–12 (1975); Dickinson, W. C., et al, "The Shallow Solar Pond Energy Conversion System," Solar Energy, Vol. 18, No. 1, pp. 3–10 (1976); Styris, D. L., et al, "The Nonconvecting Solar Pond Applied to Building and Process Heating," Solar Energy, Vol. 18, No. 3, pp. 245–252 (1976); Mehta, G. D., et al, "Engineering and Economics of a Solar Pond System," 16th Annual ASME Symposium on Energy Alternatives, Albuquerque, New Mexico, Feb. 26–27, (1976); and Nielsen, C. E., "Experience with a Prototype Solar Pond for Space Heating", Proceedings of the International Solar Energy Society meeting at Winnipeg, Canada, Vol. 5, pp. 169–182, 1976.

The following article is of general interest: McCoy, H., "Equilibrium in the System Composed of Sodium Carbonate, Sodium Bicarbonate, Carbon Dioxide, and Water," American Chemical Journal, XXIX, January-June, 1903.

In addition, the following patents may be of interest:

| U.S. Pat. No. | Patentee | Date |
| --- | --- | --- |
| 3,372,691 | Shachar | March 12, 1968 |
| 2,388,009 | Pike | October 30, 1945 |
| 3,277,883 | Rowelsamp | October 11, 1966 |
| 3,314,414 | Rowelsamp | April 18, 1967 |
| 3,314,415 | Rowelsamp | April 18, 1967 |

| U.S. Pat. No. | Patentee | Date |
|---|---|---|
| 3,161,193 | Rowelsamp | December 15, 1964 |
| 3,667,980 | Neitzel, et al | June 6, 1972 |
| 3,910,253 | Thomason, et al | October 7, 1975 |
| 4,026,270 | Ramey | May 31, 1977 |

Also, Australian Pat. No. 236,337 to Tabor, et al, accepted Nov. 7, 1961.

SUMMARY OF THE INVENTION

According to the invention, a saturated non-convecting solar pond uses a saturated brine consisting preferably of a mixture of sodium carbonate ($Na_2CO_3$) and sodium bicarbonate ($NaHCO_3$) in water together with a transparent cover on the pond surface to impede transfer of carbon dioxide. The utility of mixtures of $Na_2CO_3$ and $NaHCO_3$ is an unexpected and unforeseen result in view of the fact that neither $Na_2CO_3$ by itself nor $NaHCO_3$ by itself would be satisfactory, as discussed in the following detailed description.

DESCRIPTION OF THE DRAWINGS

The objects, advantages, and novel features of the invention will be more fully apparent from the following description when read in connection with the accompanying drawing in which.

DETAILED DESCRIPTION OF THE DISCLOSED EMBODIMENT

Figure 2:
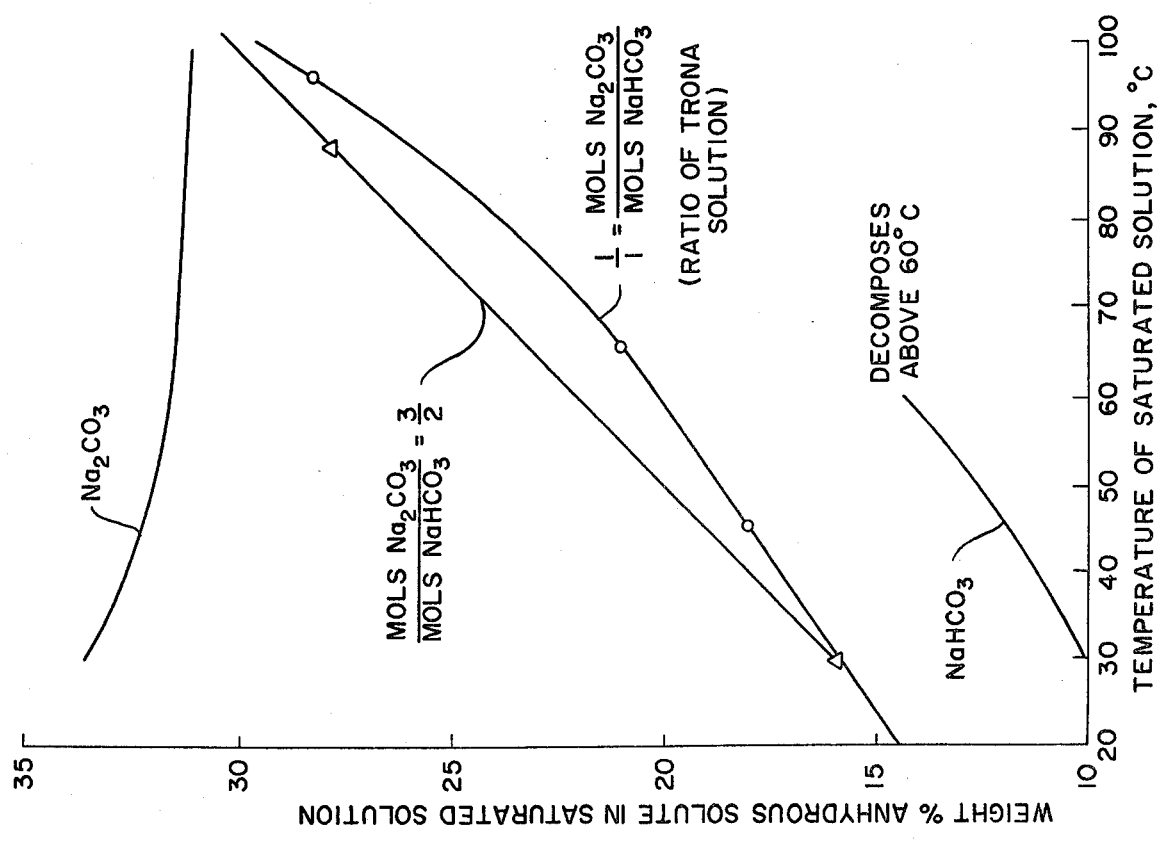
FIG. 2 is a graph of weight percent of anhydrous solute in saturated solution in water against temperatures in °C. of sodium carbonate, sodium bicarbonate, and two mixtures thereof.

Sodium bicarbonate by itself has a fairly desirable solubility curve extending from about 10 wt. % at 30° C. to about 14% at 60° C. (FIG. 2). Unfortunately, sodium bicarbonate tends to dissociate in water solution into sodium carbonate, water and carbon dioxide. Therefore, sodium bicarbonate is not a suitable material to form the desired brine. On the other hand, sodium carbonate in solution absorbs carbon dioxide, and its solubility is rather insensitive to temperature in the desired range, of say approximately 30° to 100° C., as shown in FIG. 2.

Figure 3:
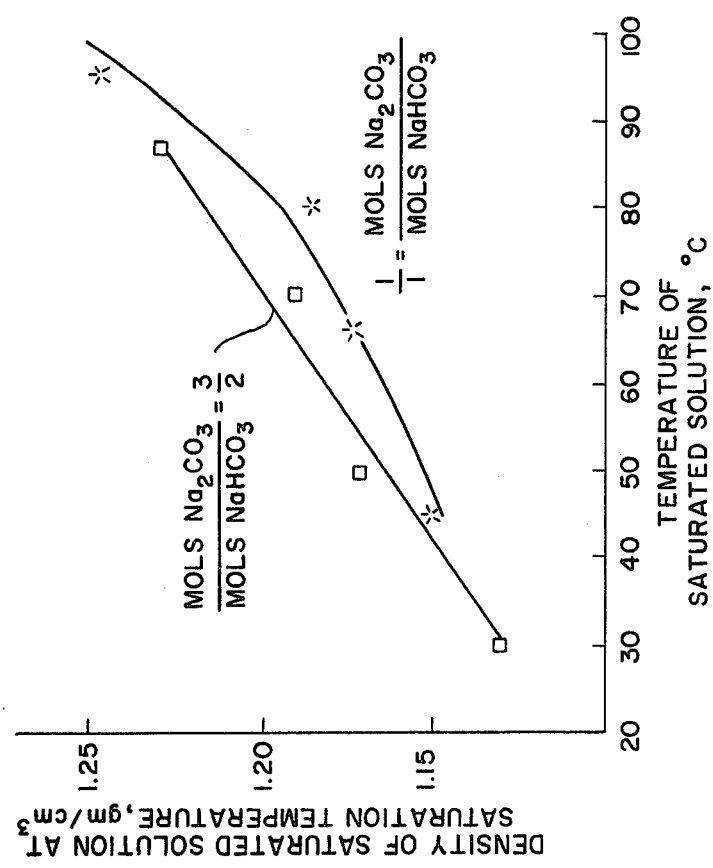
FIG. 3 is a graph of the density of saturated solution at saturation temperature, in grams per cubic centimeter, against temperature in °C. for the two mixtures.

We have found that the density of a brine formed by an appropriate mixture of sodium bicarbonate and sodium carbonate increases with increase in temperature, the solubility at saturation of the mixture increases with temperature, and the average solubility is not too great. Furthermore, in such an appropriate mixture, the dissolution of sodium bicarbonate by $CO_2$ loss is suppressed by the presence of the sodium carbonate and can be virtually eliminated by use of a transparent pond cover. The cover can be made of a material which acts as a barrier to $CO_2$ transmission and may consist of a plastic film or alternatively a monomolecular liquid film. Some of the desirable qualities of the mixture are shown in FIG. 2 and FIG. 3, as exemplified by a 1.9/1 by weight (3:2 ratio in mols) mixture of sodium carbonate and sodium bicarbonate. However, it is not intended to imply that this is the only appropriate ratio, a 2/1 mixture and other ratios being adequate. Those skilled in the art will appreciate that the limits of the value of this ratio are imposed by saturated pond requirements and the characteristics of $Na_2CO_3/NaHCO_3$ mixtures in solution.

We prefer a mixture of about 1.9 to 1 by weight of $Na_2CO_3$ to $NaHCO_3$ or about a three to two (3:2) molar ratio as exemplary for the purposes expressed herein. FIG. 2 shows the weight percent of an anhydrous solute in a saturated solution plotted against the temperature of the saturated solution in degrees centigrade for sodium bicarbonate ($NaHCO_3$), a 1.9/1 (3:2 mols) mixture of sodium carbonate ($Na_2CO_3$) and sodium bicarbonate ($NaHCO_3$), and sodium carbonate ($Na_2CO_3$). The curve for sodium bicarbonate terminates at about 60° C. at which point the sodium bicarbonate dissociates freely, liberating carbon dioxide. The curve for sodium carbonate shows that its solubility somewhat decreases and then becomes practically constant with temperature above about 30° C. or a little over. This characteristic makes the use of sodium carbonate by itself in a saturated non-convecting solar pond impractical.

On the other hand, the 1.9/1 mixture is substantially stable at high temperatures, particularly if a transparent pond cover relatively impermeable to $CO_2$ is used, and shows a regular increase in saturation concentration (and solution density) as the temperature increases. Conversely as the saturated 1.9/1 solution decreases in temperature, salt would tend to be precipitated. If the vertical decreases of temperature in a pond were from a lower level to a higher level in a saturated 1.9/1 solution, this characteristic would tend to prevent diffusional mixing and the layers would tend to remain intact, each at its own weight percent of the solute in saturation at the temperature of the particular layer under consideration. The curve for Trona (1:1 molar ratio) is shown for comparison. Trona, $Na_2CO_3 \cdot NaHCO_3 \cdot 2H_2O$, is also known as sodium sesquicarbonate.

FIG. 3 shows the curve for the density of the saturated 1.9/1 (3:2 molar ratio) solution described above at saturation temperature in grams per cubic centimeter plotted against the temperature of the saturated solution in degrees centigrade. The density increases progressively from about 30° C. to near 90° C. The curve for Trona (1:1 molar ratio) is shown for comparison. The foregoing shows that an appropriate mixture of sodium carbonate with sodium bicarbonate is an outstanding solute for use in a saturated non-convecting solar pond system. The density of the saturated solution increases adequately with an increase in temperature. The average solubility is sufficiently low so that an inordinately large quantity of the salt is not required to achieve the saturated solution. Moreover, the solution is substantially transparent and nontoxic. Transparency in solution is essential in order that the pond may be insolated with some efficiency. The sodium bicarbonate in the solution is relatively stable against carbon dioxide liberation because of the presence of adequate sodium carbonate and is made more stable by a transparent pond cover relatively impermeable to $CO_2$. Moreover, the dual salt mixture is inexpensive and is available in large quantities. It can be made from sodium carbonate and Trona, which is cheap and plentiful and available from several sources. One well known source is at Green River, Wyoming. The Trona from that source is about 95% pure by weight as mined and large quantities are secured with a relatively simple mining and crushing operation. Quite pure Trona is obtained from this Trona ore by a cheap, mass-production operation, as a prelude to sodium carbonate production. It is estimated that an appropriate 1.9/1 by weight mixture of $Na_2CO_3$ and $NaHCO_3$ in a saturated pond one meter deep would cost in the order of 10 dollars per square meter, a cost similar to that of salts (such as $NaCl$, $MgCl_2$) presently used in unsaturated ponds.

Figure 1:
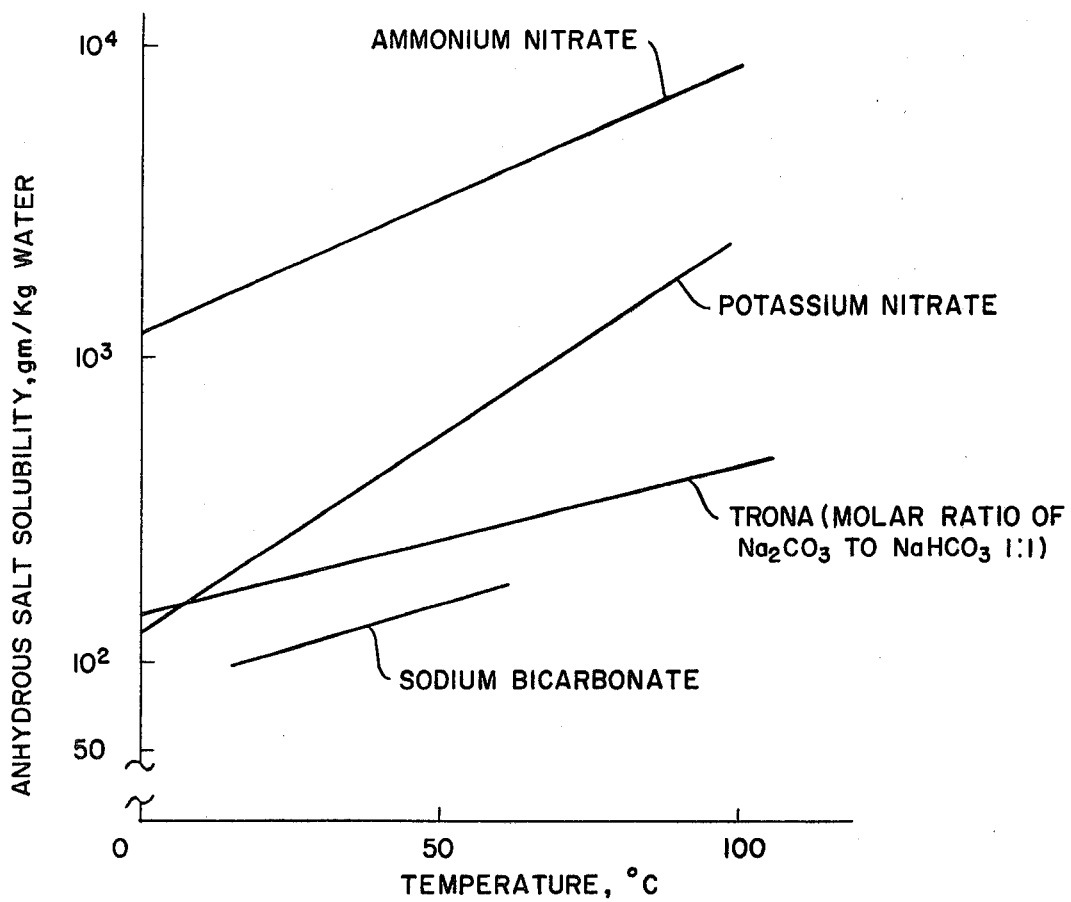
FIG. 1 is a graph of solubility in water in grams per kilogram against temperature in °C. of some illustrative salts which have been proposed or are discussed herein for a saturated pond.
Figure 4:
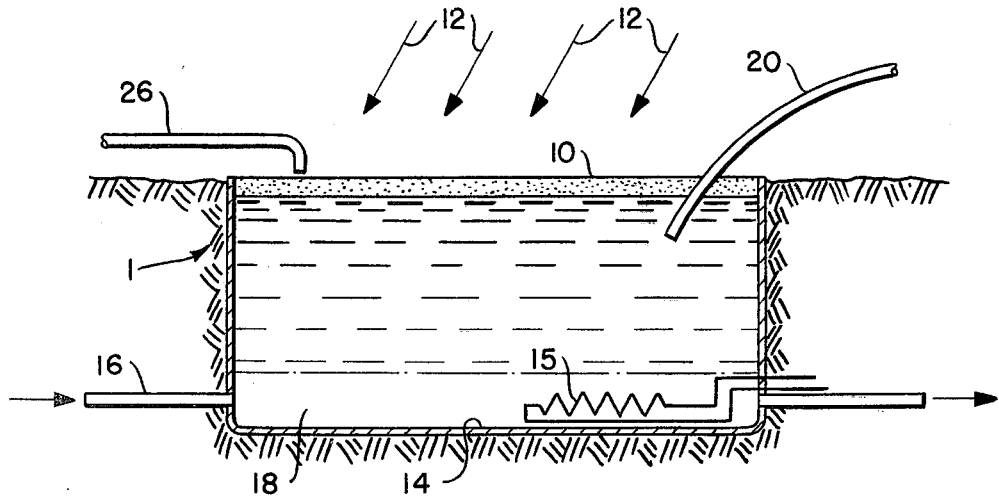
FIG. 4 is a schematic representation of a saturated non-convecting solar pond system embodying the invention.

Referring to FIG. 4, a solar pond 1 receives solar radiation 12. The bottom layer 14 is preferably black to absorb a large fraction of the solar radiation and convert it to heat. The top of the pond is preferably covered with a transparent plastic cover 10 such as "nitrile barrier" film (p. 32, Modern Plastics Encyclopedia, Vol. 52, No. 10A) which will impede the loss of generated $CO_2$ and collect it at the brine surface at a gaseous pressure less than atmospheric pressure, but sufficient to achieve equilibrium with the partial pressure of $CO_2$ in the liquid solution. The heat from the bottom layer may be converted to energy by any suitable heat exchange mechanism such as one or more coils 15 arranged in heat exchange relationship with the lowermost layer 18 of the solution in the pond. Alternatively the lowermost layer of the pond may be pumped outside of the pond to supply heat for heating purposes or to operate an engine producing mechanical or electrical energy (See for example, the Styris, et al Battelle Report 1891 cited above).

The concentration and density gradients are self-generating. It is merely necessary to place in the pond sufficient quantities of the appropriate $Na_2CO_3$/$NaHCO_3$ mixture, such as the 1.9/1 by weight mixture, so that there will be a slight excess when final equilibrium is established. The incident solar energy on water added through supply pipe 20 will create an initial temperature difference. The 1.9/1 mixture will dissolve accordingly, setting up a slight concentration and hence density gradient. This density gradient will inhibit convection, thus encouraging a greater temperature difference, more dissolution, a greater concentration and density gradient, etc., until the pond is completely saturated. Alternatively, a cool, near saturation weak solution may be fed into the bottom zone, through inlet pipe 16, then slowly a warmer, more concentrated solution which will lift the weaker solution and so forth until a step-like density gradient has been produced.

Alternatively, a solution of different density may be added in the reverse order from the top either through a supply pipe 26 or by using the flexible hose 20. It may be desirable to add some water on the surface of the pond 10 through the supply pipe 26 in order to prevent or reduce loss of liquid by evaporation.

After a period of insolation the pond will have a temperature gradient substantially as desired with a substantial rise in temperature at the bottom and almost no rise in temperature at the surface which will approach the ambient temperature. There being no convection in the liquid, the transfer of heat from the bottom to the top will be solely by conduction, which is relatively small. The desired concentration, density, and temperature gradients should then be maintained. These limits on density and temperature can be determined from the probable temperature limits at the top of 25° C. to 100° C. at the bottom. The heat absorbed by such a pool may be used as described in this patent or any other suitable way suggested in the prior art, as in the Styris, et al report cited above.

In the on-going operation of the pond, there may be $CO_2$ losses at a low rate. To make up for such losses $NaHCO_3$ can be added at the same time that high alkalinity solution is removed.

It will be clear from the foregoing that there has been described a highly desirable non-convecting solar pond which uses a saturated brine solution of an appropriate mixture of sodium carbonate and sodium bicarbonate. Such a system has substantial advantages over unsaturated non-convecting solar ponds and over saturated non-convecting solar ponds utilizing presently contemplated solutes.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. A solar energy collection solution comprising a vertically varying concentration of a solute in a liquid column of a brine solution, said solute consisting essentially of a mixture of sodium carbonate and sodium bicarbonate dissolved in water as solvent; in operation, said solution being substantially a saturated solution, the solute concentration and density of said solution being greatest at a lower, hotter level of the solution and decreasing continuously toward an upper, cooler level the said molar ratio of sodium carbonate to sodium bicarbonate being in the order of three to two, in which a transparent cover material means is used as a barrier material over the solution for the purpose of impeding carbon dioxide transfer across the solution surface.

2. A solar energy collecting solution as claimed in claim 1, in which said cover material is solid.

3. A solar energy collecting solution as claimed in claim 1, and in which the mol ratio of sodium carbonate to sodium bicarbonate is in the order of three to two.

4. A non-convecting solar pond containing a solution consisting essentially of a mixture of sodium carbonate and sodium bicarbonate as solute dissolved in water as solvent; in operation, said solution being substantially saturated throughout the pond, with the solute concentration and density of said solution being greatest at a lower, hotter level and decreasing continuously toward an upper, cooler level the said molar ratio of sodium carbonate to sodium bicarbonate being in the order of three to two, in which a transparent cover material means is used as a barrier over the solution for the purpose of impeding carbon dioxide transfer across the solution surface.

5. A non-convecting solar pond as claimed in claim 4, in which said cover material is a solid.

6. A non-convecting solar pond as claimed in claim 4, and in which the mol ratio of sodium carbonate to sodium bicarbonate is in the order of three to two.

* * * * *